(12) United States Patent
Hashimoto et al.

(10) Patent No.: US 11,325,770 B2
(45) Date of Patent: May 10, 2022

(54) BUFFER MEMBER AND BUFFER MEMBER FORMING MATERIAL

(71) Applicant: KONICA MINOLTA, INC., Tokyo (JP)

(72) Inventors: Takeshi Hashimoto, Okazaki (JP); Narutaka Yoshida, Toyokawa (JP); Hiromi Mizuguchi, Toyokawa (JP); Masakazu Ideno, Toyohashi (JP)

(73) Assignee: KONICA MINOLTA INC., Tokyo (JP)

( * ) Notice: Subject to any disclaimer, the term of this patent is extended or adjusted under 35 U.S.C. 154(b) by 155 days.

(21) Appl. No.: 16/811,190

(22) Filed: Mar. 6, 2020

(65) Prior Publication Data
US 2020/0317420 A1 Oct. 8, 2020

(30) Foreign Application Priority Data

Apr. 2, 2019 (JP) .................................. 2019-070369

(51) Int. Cl.
*B65D 81/05* (2006.01)
*B29L 31/00* (2006.01)

(52) U.S. Cl.
CPC ...... *B65D 81/052* (2013.01); *B29L 2031/7138* (2013.01)

(58) Field of Classification Search
CPC ... B65D 81/052; B65D 81/054; B65D 81/056
(Continued)

(56) References Cited

U.S. PATENT DOCUMENTS

| 7,464,520 B2 * | 12/2008 | Nishi | .................. | B31D 5/0073 53/472 |
| 8,366,594 B2 * | 2/2013 | Zhang | .................... | B65D 81/03 493/189 |

(Continued)

FOREIGN PATENT DOCUMENTS

| CN | 101012020 A | 8/2007 |
| CN | 201077603 Y | 6/2008 |

(Continued)

OTHER PUBLICATIONS

European Search Report issued in corresponding European Patent Application No. 20165391, dated Jul. 7, 2020 (9 pages).

(Continued)

*Primary Examiner* — Steven A. Reynolds
(74) *Attorney, Agent, or Firm* — Buchanan Ingersoll & Rooney PC

(57) ABSTRACT

A buffer member includes: a resin sheet welded in a bag-like shape; and a medium sealed in the resin sheet, wherein the resin sheet includes a plurality of buffer areas each having a shape extending longitudinally in a first direction and arranged adjacent to each other in a second direction orthogonal to the first direction, each buffer area of the plurality of buffer areas includes a first buffer chamber having a shape extending in the first direction, a second buffer chamber having a shape extending in the first direction and formed at a position separated from the first buffer chamber in the first direction, and a connecting flow passage connecting the first buffer chamber and the second buffer chamber.

9 Claims, 8 Drawing Sheets

(58) Field of Classification Search
USPC .................................................. 206/522, 586
See application file for complete search history.

(56) References Cited

U.S. PATENT DOCUMENTS

| | | | | |
|---|---|---|---|---|
| 8,714,356 B2* | 5/2014 | Liao | ..................... | B65D 81/052 |
| | | | | 206/522 |
| 11,046,498 B2* | 6/2021 | Liao | ....................... | B65D 81/03 |
| 2003/0108699 A1* | 6/2003 | Tanaka | ................. | B65D 81/052 |
| | | | | 428/35.2 |
| 2006/0144745 A1* | 7/2006 | Abe | ..................... | B65D 81/052 |
| | | | | 206/522 |
| 2013/0032504 A1* | 2/2013 | Liao | ..................... | B65D 81/052 |
| | | | | 206/522 |

FOREIGN PATENT DOCUMENTS

| | | |
|---|---|---|
| JP | 2013-173553 | 9/2013 |
| JP | 2013173553 A | 9/2013 |

OTHER PUBLICATIONS

First Office Action dated Sep. 7, 2021, by the Chinese Patent Office in corresponding Chinese Patent Application No. 202010253165.5, and an English Translation of the Office Action. (14 pages).

* cited by examiner

BUFFER MEMBER AND BUFFER MEMBER FORMING MATERIAL

The entire disclosure of Japanese patent Application No. 2019-070369, filed on Apr. 2, 2019, is incorporated herein by reference in its entirety.

BACKGROUND

Technological Field

The present invention relates to a buffer member and a buffer member forming material.

Description of the Related Art

Buffer members used for packing articles to be packed have been known. For example, JP 2013-173553 A discloses an air buffer material (buffer member) in which air is sealed in resin sheets welded in a bag-like shape. This air buffer material includes a plurality of inflated parts each partitioned by a transverse partitioning welded part. Each inflated part has a plurality of compartment inflated parts provided continuously in one direction, and an air flow passage connecting the adjacent compartment inflated parts. The compartment inflated parts are individually divided by a bending welded part, and the air flow passage is defined by the bending welded part. The bending welded part has a pair of protruding parts having a shape protruding from the transverse partitioning welded part in a direction orthogonal to the one direction.

This air buffer material is disposed between the article to be packed and the cardboard box in a state where the air buffer material is bent at the bending welded part. Here, the tip end of each protruding part is formed in a rounded shape. This suppresses the formation of wrinkles in the vicinity of the protruding parts when each of the inflated parts is bent at the bending welded part.

The buffer member described in JP 2013-173553 A has an insufficient buffer function against external force applied to the cardboard box from outside the cardboard box.

SUMMARY

It is an object of the present invention to provide a buffer member and a buffer member forming material capable of suppressing formation of a corner part at a bent part and enhancing the buffering function as well.

To achieve the abovementioned object, according to an aspect of the present invention, a buffer member reflecting one aspect of the present invention comprises: a resin sheet welded in a bag-like shape; and a medium sealed in the resin sheet, wherein the resin sheet includes a plurality of buffer areas each having a shape extending longitudinally in a first direction and arranged adjacent to each other in a second direction orthogonal to the first direction, each buffer area of the plurality of buffer areas includes a first buffer chamber having a shape extending in the first direction, a second buffer chamber having a shape extending in the first direction and formed at a position separated from the first buffer chamber in the first direction, and a connecting flow passage connecting the first buffer chamber and the second buffer chamber, a length of the connecting flow passage in the second direction is smaller than a length of the first buffer chamber and a length of the second buffer chamber in the second direction, and the connecting flow passage of one buffer area of the plurality of buffer areas and the connecting flow passage of an adjacent buffer area adjacent to the one buffer area of the plurality of buffer areas are separated from each other in the second direction, and the connecting flow passage directs the medium flowing into the connecting flow passage from one of the first buffer chamber and the second buffer chamber along the first direction to bend in a direction intersecting the first direction, while redirecting the medium flowing out of the connecting flow passage and into the other buffer chamber of the first buffer chamber and the second buffer chamber to bend in the first direction again.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
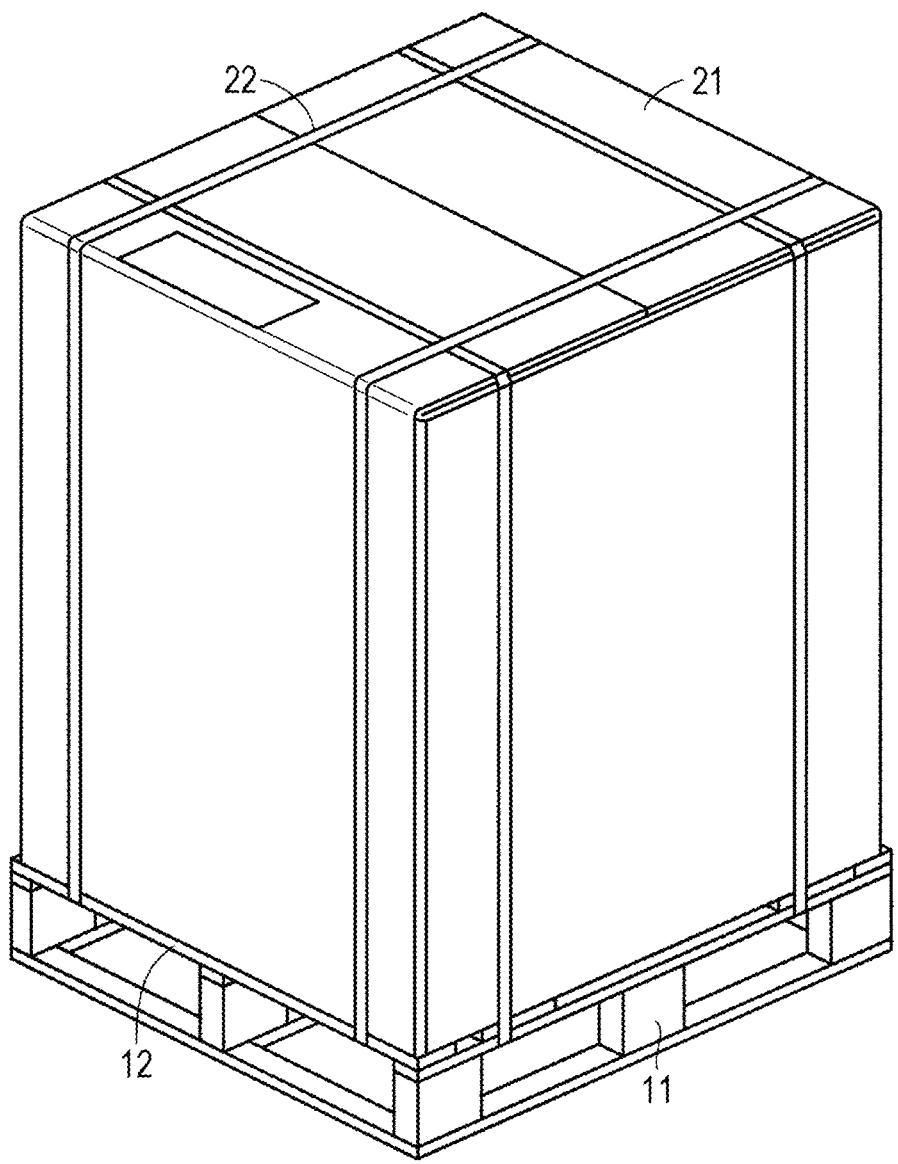
FIG. 1 is a perspective view schematically illustrating a state in which an image forming apparatus according to an embodiment of the present invention is packed in an outer box.

Hereinafter, one or more embodiments of the present invention will be described with reference to the drawings. However, the scope of the invention is not limited to the disclosed embodiments. In the drawings referred to below, the same or equivalent members are denoted by the same reference numerals.

Figure 2:
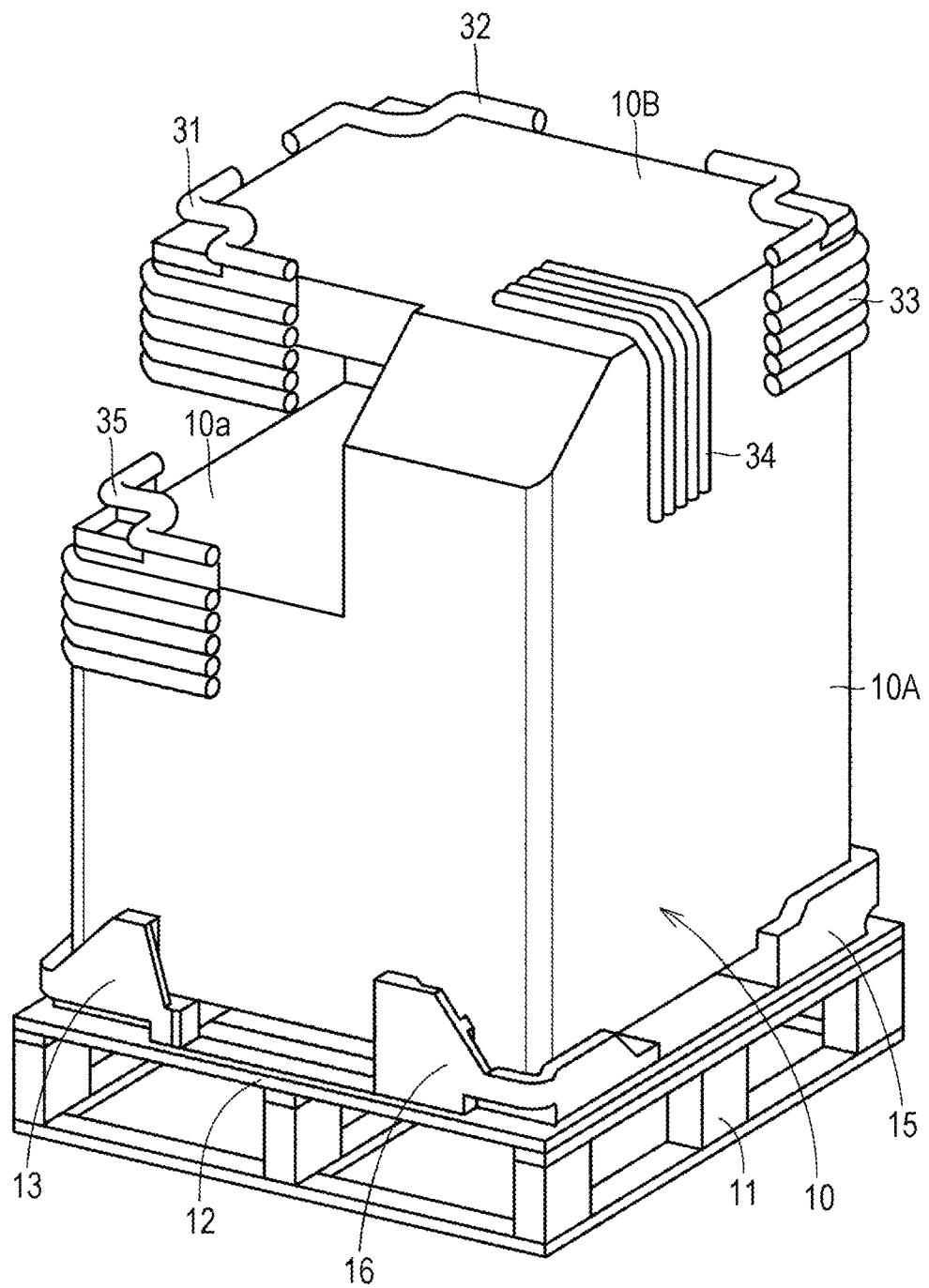
FIG. 2 illustrates a state in which an outer box has been removed from the packing state illustrated in FIG. 1.
Figure 3:
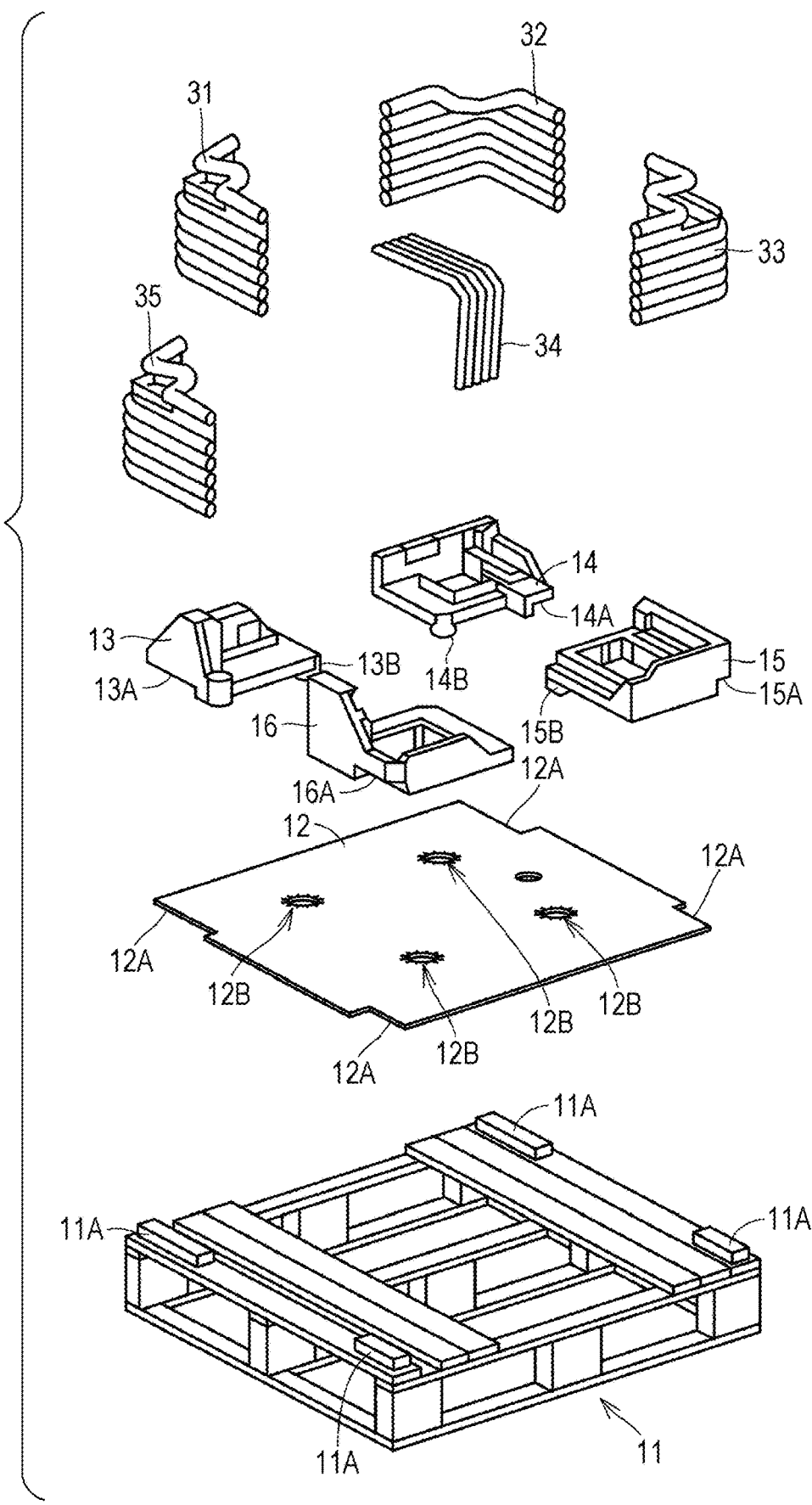
FIG. 3 is an exploded perspective view of a plurality of members used for packing the image forming apparatus illustrated in FIG. 2.

FIG. 1 is a perspective view schematically illustrating a state in which an image forming apparatus according to an embodiment of the present invention is packed in an outer box. FIG. 2 illustrates a state in which the outer box has been removed from the packed state illustrated in FIG. 1. FIG. 3 is an exploded perspective view of a plurality of members used for packing the image forming apparatus illustrated in FIG. 2. Hereinafter, a packed state in which the image forming apparatus 10 is packed is described with reference to FIGS. 1 to 3.

As illustrated in FIGS. 1 to 3, to pack the image forming apparatus 10, a pallet 11, a plate-like pad 12, a plurality of foam materials 13 to 16, a plurality of buffer members 31 to 35, an outer box 21, and a fixing member 22 are used.

The pallet 11 is formed by combined wooden plate materials. The pallet 11 may be formed of a resin member. At four corners on the upper surface of the pallet 11, positioning members 11A are provided for positioning a plate-like pad 12 and the plurality of foam materials 13 to 16. The positioning members 11A are, for example, square logs.

The plate-like pad 12 is formed by punching a cardboard. The plate-like pad 12 is not limited to cardboard, and may be formed of a resin member such as plastic.

At four corners of the plate-like pad 12, cutout parts 12A are provided. The cutout parts 12A engage with the positioning members 11A when the plate-like pad 12 is placed on the pallet 11. Thus, the plate-like pad 12 is positioned with respect to the pallet 11.

The plate-like pad 12 includes a plurality of engagement holes 12B. The plurality of engagement holes 12B is used for positioning the plurality of foam materials 13 to 16. Note that slits are formed radially around each engagement hole 12B.

The foam materials 13 to 16 are molded from foamed styrol. The foam materials 13 to 16 are provided so as to support the bottom of the image forming apparatus 10 and abut on side surfaces of an apparatus main body 10A. The foam materials 13 to 16 are individually formed according to the shapes of the four corners of the apparatus main body 10A.

Figure 4:
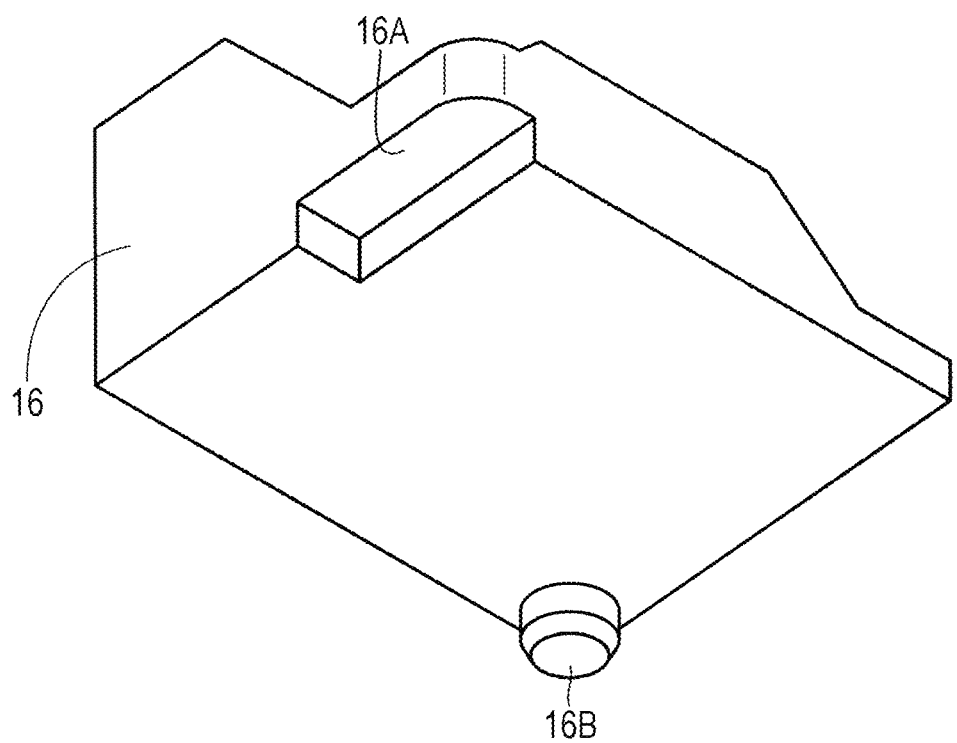
FIG. 4 is a perspective view of a foam material of a plurality of members illustrated in FIG. 3 when viewed from a bottom surface side.

FIG. 4 is a perspective view of the foam material of the plurality of members illustrated in FIG. 3 as viewed from the bottom surface side. As illustrated in FIG. 4, the bottom surface of the foam material 16 is provided with an engagement recess 16A recessed upward and an engagement protrusion 16B protruding downward. Like the foam material 16, as illustrated in FIG. 3, the foam materials 13 to 15 also include engagement recesses 13A to 15A and engagement protrusions 13B to 15B, respectively.

The engagement recesses 13A to 16A of the foam materials 13 to 16 engage with the positioning members 11A of the pallet 11. The engagement protrusions 13B to 16B of the foam materials 13 to 16 engage with the engagement holes 12B of the plate-like pad 12. Thus, the plurality of foam materials 13 to 16 are positioned with respect to the pallet 11 and the plate-like pad 12.

Buffer members 31 to 35 are disposed at corner parts of the image forming apparatus 10, as illustrated in FIGS. 2 and 3. In the present embodiment, the plurality of buffer members 31 to 34 are disposed at four corners of a reading apparatus 10B, and the buffer member 35 is disposed at the corner part of a discharge tray 10a.

The buffer members 31 to 35 are each bent at substantially the center part so as to contact at least two surfaces of the image forming apparatus 10 having corner parts. Bent parts of the plurality of buffer members 31 to 35 are each arranged to face the ridge parts of the image forming apparatus 10.

The buffer members 31 to 33 are arranged to abut on adjacent side surfaces of a plurality of side surfaces of the reading apparatus 10B and also abut on an upper surface of the reading apparatus 10B. The buffer member 34 is disposed to contact the upper surface and the side surface of the reading apparatus 10B. The buffer member 35 is disposed to abut on the two side surfaces when mounted on the apparatus main body located near the discharge tray 10a.

The buffer members 31 to 35 are arranged to be interposed between the image forming apparatus 10 and the outer box 21. The buffer members 31 to 35 suppress transmission of an external force applied to the outer box 21 to the image forming apparatus 10. Details of the plurality of buffer members 31 to 35 will be described later.

When packing the image forming apparatus 10, the plate-like pad 12 is placed on the pallet 11, and the plurality of foam materials 13 to 16 are disposed on the plate-like pad 12. Subsequently, the image forming apparatus 10 wrapped in a protective plastic bag (not illustrated) is disposed on the plurality of foam materials 13 to 16, and the plurality of buffer members 31 to 35 are each provided at corner parts of the image forming apparatus 10. Then, an outer box 21 opening downward is put to cover the whole components. The outer box 21 is formed by cardboard or the like. Lastly, the outer box 21 and the pallet 11 are fixed with a fixing member 22 such as a plastic tape.

As described above, the article to be packed such as the image forming apparatus 10 is packed using the plurality of buffer members 31 to 35.

Figure 5:
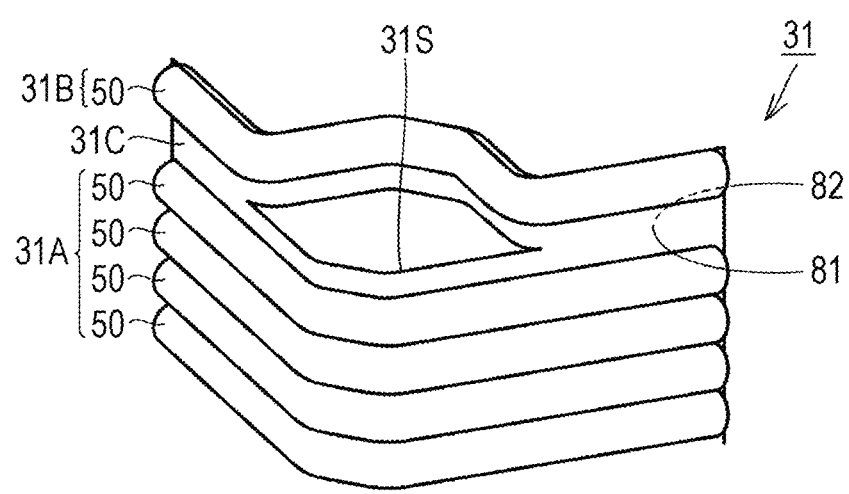
FIG. 5 is a perspective view of a buffer member among a plurality of members illustrated in FIG. 3.
Figure 6:
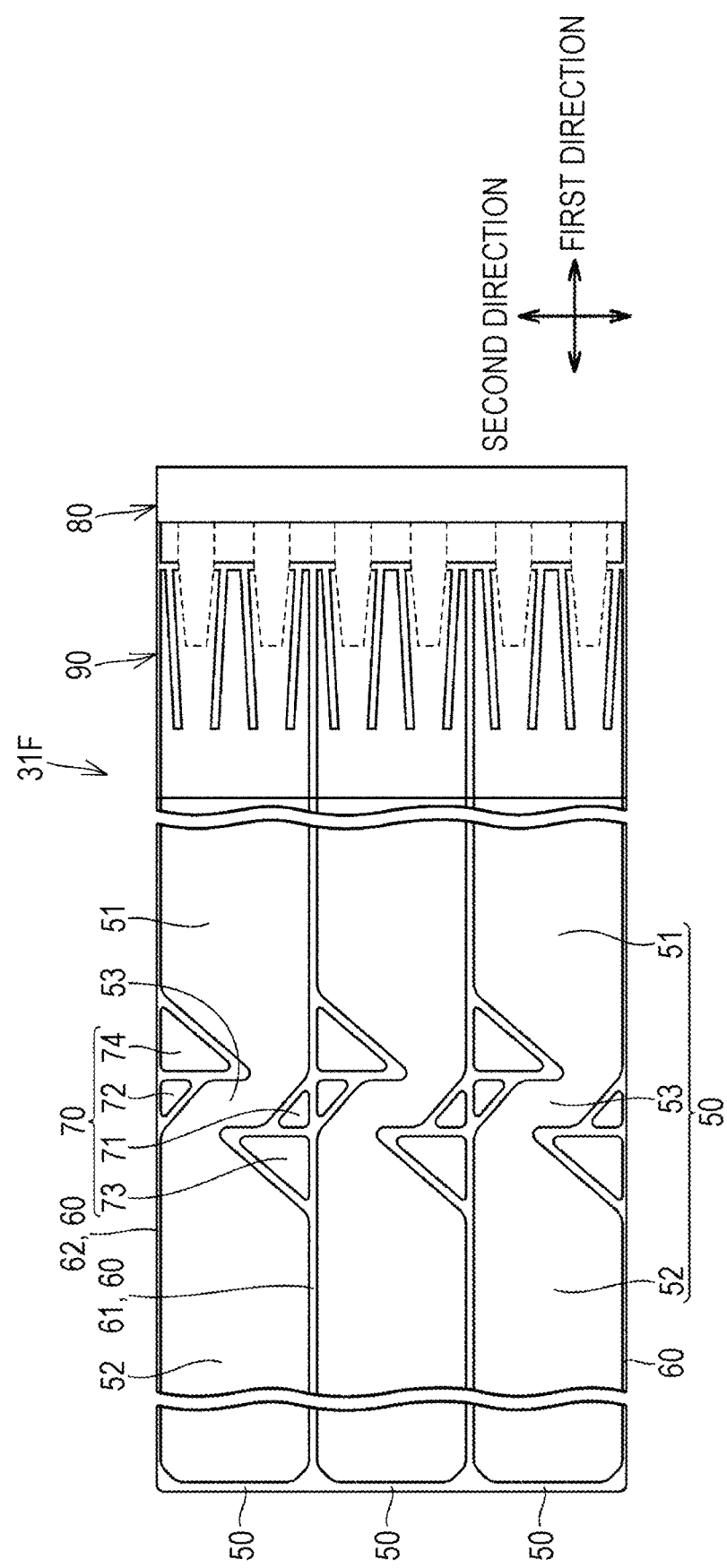
FIG. 6 is a plan view of a buffer member forming material according to the embodiment of the present invention.
Figure 7:
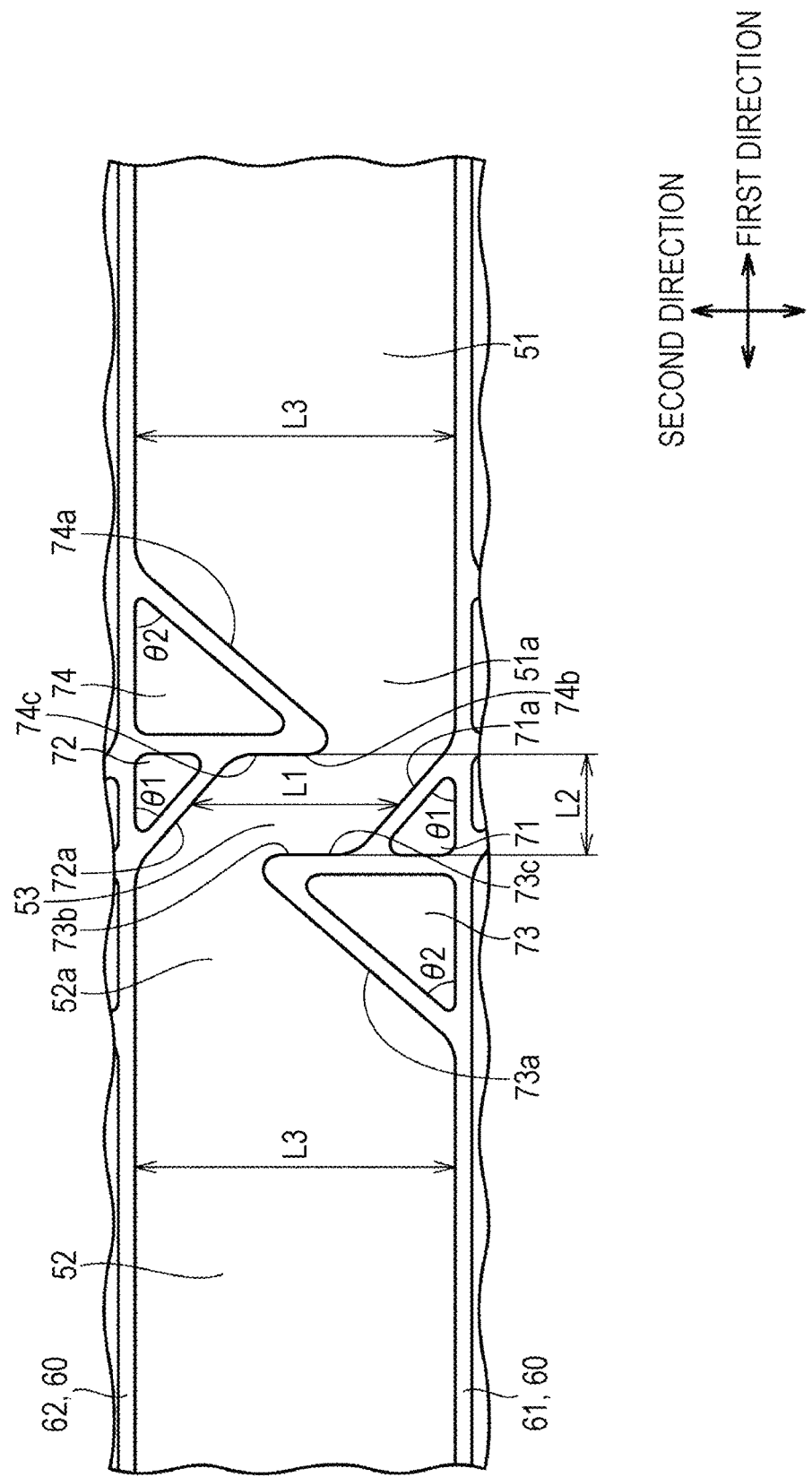
FIG. 7 is an enlarged view around a connecting flow passage of a specific buffer member forming material.

Next, the buffer members 31 to 35 are described with reference to FIGS. 5 to 7. FIG. 5 is a perspective view of a buffer member among the plurality of members illustrated in FIG. 3. FIG. 6 is a plan view of a buffer member forming material according to an embodiment of the present invention. FIG. 7 is an enlarged view near a connecting flow passage of a specific buffer area forming material. The buffer members 31 to 35 are formed substantially similarly, and the buffer member 31 is described here.

As illustrated in FIG. 5, the buffer member 31 is formed by welding a first resin sheet 81 and the second resin sheet 82 in a bag-like shape. The first resin sheet 81 and the second resin sheet 82 are formed in a layered structure of, for example, nylon and polyethylene. The buffer member 31 includes a plurality of buffer areas 50. In each buffer area 50, a medium (air in the present embodiment) is sealed. Hereinafter, a member including the first resin sheet 81 and the second resin sheet 82 which are welded in a bag-like shape, and in which the medium is sealed in the resin sheets 81 and 82 to form the buffer member 31 will be referred to as a "buffer member forming material 31F". The buffer areas 50 each have an elongated shape extending in a first direction (see FIGS. 6 and 7), and are arranged adjacent to each other in a second direction orthogonal to the first direction. The buffer member 31 includes a first buffer part 31A, a second buffer part 31B, and a connecting part 31C.

The first buffer part 31A includes at least one buffer area 50. In the present embodiment, the first buffer part 31A includes four buffer areas 50. These four buffer areas 50 are arranged in the second direction.

The second buffer part 31B includes at least one buffer area 50. In the present embodiment, the second buffer part 31B includes one buffer area 50. The second buffer part 31B is disposed at a position separated from the first buffer part 31A in the second direction.

The connecting part 31C connects the first buffer part 31A to the second buffer part 31B. The connecting part 31C is formed by welding the first resin sheet 81 and the second resin sheet 82 to each other so as to form a strip extending along the first direction. A cutout part 31S is provided at the center of the connecting part 31C. The cutout part 31S is provided in parallel with a longitudinal direction of the connecting part 31C.

By providing the cutout part 31S, the second buffer part 31B can be deformed independently of the first buffer part 31A. Thus, as illustrated in FIG. 2, the first buffer part 31A can abut on the two side surfaces of the reading apparatus 10B, while the second buffer part 31B can abut on the upper surface of the reading apparatus 10B.

The number of buffer areas 50 provided in the first buffer part 31A and the second buffer part 31B may be changed as appropriate. In addition, the connecting part 31C may be omitted. For example, the buffer member 34 illustrated in FIG. 2 does not include the connecting part 31C.

As illustrated in FIGS. 6 and 7, each buffer area 50 includes a first buffer chamber 51, a second buffer chamber 52, and a connecting flow passage 53.

The first buffer chamber 51 has a shape extending in the first direction. The first buffer chamber 51 has a substantially circular cross-section when cut along a plane orthogonal to the first direction.

The second buffer chamber 52 has a shape extending in the first direction. The second buffer chamber 52 is formed at a position separated from the first buffer chamber 51 in the first direction. The second buffer chamber 52 has a substantially circular cross-section when cut along a plane orthogonal to the first direction.

The connecting flow passage 53 connects the first buffer chamber 51 and the second buffer chamber 52.

In the present embodiment, the buffer member 31 or the buffer member forming material 31F further includes an injection part 80 and a check valve 90.

The injection part 80 is a site where the medium is injected into the buffer area 50. The injection part 80 is provided at an end part of the first buffer chamber 51 opposite to the side where the connecting flow passage 53 is located.

The check valve 90 is provided in the injection part 80. More specifically, the check valve 90 is disposed between the injection part 80 and the first buffer chamber 51. The check valve 90 allows the medium to flow from the injection part 80 into the buffer area 50 and prohibits the flow of the medium out of the buffer area 50.

Next, a welded part provided on the buffer member 31 or the buffer member forming material 31F is described with reference to FIGS. 6 and 7. Each resin sheet 81, 82 (buffer member forming material 31F) includes a plurality of compartment welded parts 60 and partitioning welded parts 70.

Each compartment welded part 60 forms a plurality of buffer areas 50. Specifically, each compartment welded part 60 is a part where the first resin sheet 81 and the second resin sheet 82 are welded to form the plurality of buffer areas 50. Each compartment welded part 60 has a shape extending in the first direction.

As illustrated in FIGS. 6 and 7, the compartment welded parts 60 include a compartment welded part 61 and an adjacent compartment welded part 62. The compartment welded part 61 is one of the plurality of compartment welded parts 60. The adjacent compartment welded part 62 is a compartment welded part 60 adjacent to the one compartment welded part 61 of the plurality of compartment welded parts 60. In FIGS. 6 and 7, the compartment welded part 60 formed on the lower side of the buffer area 50 is illustrated as "one compartment welded part 61", and the compartment welded part 60 formed on the upper side of the buffer area 50 is illustrated as "adjacent compartment welded part 62", but these may be reversed.

The partitioning welded part 70 partitions each buffer area 50 into a first buffer chamber 51, a second buffer chamber 52, and a connecting flow passage 53. Specifically, the partitioning welded part 70 is a site in which the first resin sheet 81 and the second resin sheet 82 are welded together so as to partition each buffer area 50 into the first buffer chamber 51, the second buffer chamber 52, and the connecting flow passage 53.

In the compartment welded part 60 and the partitioning welded part 70, an entire area constituting the compartment welded part 60 and the partitioning welded part 70 may be welded, or only the edge part of the area may be welded to form a closed space.

The partitioning welded part 70 includes a first opposing welded part 71, a second opposing welded part 72, a first protruding welded part 73, and a second protruding welded part 74.

The first opposing welded part 71 is formed on one side (lower side in FIG. 6) of the connecting flow passage 53 in the second direction. The first opposing welded part 71 has a shape protruding from one compartment welded part 61 toward an adjacent compartment welded part 62.

As illustrated in FIG. 7, the first opposing welded part 71 has a first guide inclined part 71a. The first guide inclined part 71a has a shape inclined to gradually approach the adjacent compartment welded part 62 as moving away from the first buffer chamber 51. The first guide inclined part 71a guides the medium flowing from the first buffer chamber 51 into the connecting flow passage 53 to move in the second direction. An angle θ1 formed between the first guide inclined part 71a and one compartment welded part 61 is preferably set to 30 degrees or more and 60 degrees or less, and more preferably set to 45 degrees.

The second opposing welded part 72 is formed on the other side (upper side in FIG. 6) of the connecting flow passage 53 in the second direction. The second opposing welded part 72 has a shape protruding from the adjacent compartment welded part 62 at a site opposing the first opposing welded part 71 toward the first opposing welded part 71. The second opposing welded part 72 may oppose the first opposing welded part 71 in a manner overlapping at least partially the first opposing welded part 71 in the second direction.

As illustrated in FIG. 7, the second opposing welded part 72 has a second guide inclined part 72a. The second guide inclined part 72a has a shape inclined to gradually approach the compartment welded part 61 as moving away from the second buffer chamber 52. The second guide inclined part 72a guides the medium flowing from the second buffer chamber 52 into the connecting flow passage 53 to move in the second direction. The angle θ1 formed between the second guide inclined part 72a and the adjacent compartment welded part 62 is preferably set to 30 degrees or more and 60 degrees or less, and more preferably set to 45 degrees.

As illustrated in FIG. 7, when no medium is sealed in the resin sheets 81 and 82, a dimension L1 between opposing parts between the first and second opposing welded parts 71 and 72 in the second direction is larger than a dimension L2 of the first opposing welded part 71 and the second opposing welded part 72 in the first direction when no medium is sealed in the resin sheets 81 and 82. Therefore, when the medium is sealed in the buffer area 50, the connecting flow passage 53 is formed in a long columnar shape in a direction substantially parallel to the second direction.

When no medium is sealed in the resin sheets 81 and 82, the dimension L1 between the opposing parts is preferably set to 70% or less of a dimension L3 between the compartment welded part 61 and the adjacent compartment welded part 62 in the second direction. More specifically, when the medium is sealed in the buffer areas 50 and the cross-sections of the first buffer chamber 51 and the second buffer chamber 52 are approximately circular along the plane orthogonal to the first direction, the dimension L1 between the opposing parts is preferably set to be equal to or smaller than the diameter of such cross-sections, that is, equal to or smaller than $2/\pi$ of the dimension L3. Further, the dimension L1 between the opposing parts is preferably set to be 10% or more of the dimension L3.

Since the dimension L1 between the opposing parts is set in the above range, once the medium is sealed in the resin sheets 81 and 82, the length of the connecting flow passage 53 in the second direction is smaller than the length of the first buffer chamber 51 and the length of the second buffer chamber 52 in the second direction. Further, the connecting flow passages 53 adjacent to each other in the second direction (i.e., the connecting flow passage 53 of the one buffer area 50 and the connecting flow passage 53 of the adjacent buffer area 50 adjacent to the one buffer area 50) are separated in the second direction by the first opposing welded part 71 and the second opposing welded part 72.

The first protruding welded part 73 is formed on one side (left side in FIG. 6) of the connecting flow passage 53 in the first direction. The first protruding welded part 73 has a shape protruding from one compartment welded part 61 toward an adjacent compartment welded part 62. The first protruding welded part 73 is adjacent to the first opposing welded part 71 in the first direction. A protruding amount of the first protruding welded part 73 from the compartment welded part 61 is larger than a protruding amount of the first opposing welded part 71 from the compartment welded part 61. An opening that allows the medium to flow between the second buffer chamber 52 and the connecting flow passage 53 is defined between the tip end of the first protruding welded part 73 (end part on the adjacent compartment welded part 62) and the adjacent compartment welded part 62.

As illustrated in FIG. 7, the first protruding welded part 73 has a first inclined part 73a. The first inclined part 73a has a shape inclined to gradually approach the compartment welded part 61 while moving away from the connecting flow passage 53. A second support part 52a is formed in the second buffer chamber 52 by the first inclined part 73a. The second support part 52a has a shape increasing radially in the second direction while moving away from the connecting flow passage 53. The second support part 52a has a function of supporting the connecting flow passage 53 (a function of suppressing the break of the connecting flow passage 53) when the medium is sealed in the buffer area 50. An angle θ2 formed between the first inclined part 73a and the one compartment welded part 61 is preferably set to 30 degrees or more and 60 degrees or less, and more preferably set to 45 degrees.

The second protruding welded part 74 is formed on the other side (right side in FIG. 6) of the connecting flow passage 53 in the first direction. The second protruding welded part 74 has a shape protruding from the adjacent compartment welded part 62 toward the compartment welded part 61. The second protruding welded part 74 is adjacent to the second opposing welded part 72 in the first direction. A protruding amount of the second protruding welded part 74 from the adjacent compartment welded part 62 is larger than a protruding amount of the second opposing welded part 72 from the adjacent compartment welded part 62. An opening that allows the medium to flow between the first buffer chamber 51 and the connecting flow passage 53 is defined between the tip end of the second protruding welded part 74 (end part on the compartment welded part 61) and the compartment welded part 61.

As illustrated in FIG. 7, the second protruding welded part 74 has a second inclined part 74a. The second inclined part 74a has a shape inclined to gradually approach the adjacent compartment welded part 62 while moving away from the connecting flow passage 53. A first support part 51a is formed in the first buffer chamber 51 by the second inclined part 74a. The first support part 51a has a shape gradually increasing radially in the second direction while moving away from the connecting flow passage 53. The first support part 51a has a function of supporting the connecting flow passage 53 (function of suppressing a break of the connecting flow passage 53) when the medium is sealed in the buffer area 50. The angle θ2 formed between the second inclined part 74a and the adjacent compartment welded part 62 is preferably set to 30 degrees or more and 60 degrees or less, and more preferably set to 45 degrees.

The first protruding welded part 73 and the second protruding welded part 74 have overlapping parts 73b and 74b, respectively, that overlap each other in the first direction across the connecting flow passage 53. In other words, the first protruding welded part 73 has a first receiving part 73c that receives the medium flowing into the connecting flow passage 53 from the first buffer chamber 51 along the first direction, while the second protruding welded part 74 has a second receiving part 74c that receives the medium flowing from the second buffer chamber 52 into the connecting flow passage 53 along the first direction. That is, when the medium is sealed in the resin sheets 81 and 82, the connecting flow passage 53 directs the medium flowing into the connecting flow passage 53 in the first direction to bend from one of the first buffer chamber 51 and the second buffer chamber 52 toward the direction (second direction in the present embodiment) intersecting the first direction, while redirecting the medium flowing into the other buffer chamber from the connecting flow passage 53 to bend to flow in first direction again. The longitudinal direction of the connecting flow passage 53 may be inclined with respect to the second direction in such a range that the first protruding welded part 73 and the second protruding welded part 74 have the overlapping parts 73b and 74b.

In the present embodiment, the partitioning welded part 70 is located at the center of the first protruding welded part 73 and the second protruding welded part 74 in the first direction, while being formed to be point-symmetric with respective to a symmetrical point positioned in the center of the first and second opposing welded parts 71 and 72 in the second direction.

Figure 8:
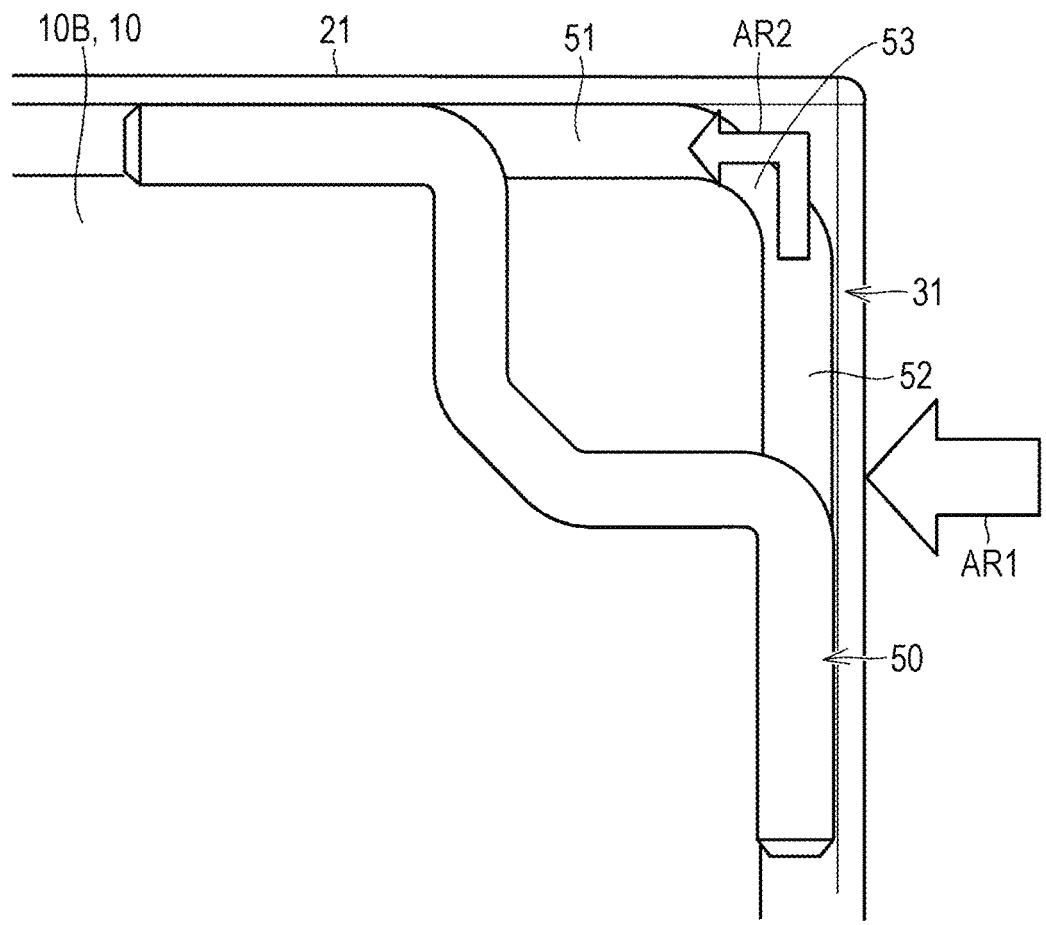
FIG. 8 illustrates a state in which an external force acts on the outer box in the packing state illustrated in FIG. 1.

Next, a case where an external force acts on the outer box 21 is described with reference to FIG. 8. FIG. 8 illustrates a state in which an external force acts on the outer box in the packed state illustrated in FIG. 1. As illustrated in FIG. 8, the second buffer chamber 52 of the buffer area 50 is pressed when the external force acts on the outer box 21 from the direction of the arrow AR1. Accordingly, the medium in the second buffer chamber 52 moves toward the first buffer chamber 51 through the connecting flow passage 53 as indicated by AR2 in FIG. 8.

The first protruding welded part 73 and the second protruding welded part 74 of the buffer member 31 of the present embodiment include overlapping parts 73b and 74b, respectively, that overlap with each other in the first direction across the connecting flow passage 53. In other words, the first protruding welded part 73 has the first receiving part 73c and the second protruding welded part 74 has the second receiving part 74c. Therefore, when the external force acts on one of the buffer chambers to direct the medium to flow from one buffer chamber to the other buffer chamber, the medium is bent twice in the connecting flow passage 53. For example, as illustrated in FIG. 8, when the external force acts on the second buffer chamber 52, the medium flowing from the second buffer chamber 52 to the first buffer chamber 51 hits the second receiving part 74c of the second protruding welded part 74 in the first direction, hits the first opposing welded part 71 in the second direction, and then flows into the first buffer chamber 51 in the first direction again in the connecting flow passage 53. A resistance occurs when the medium passes through the connecting flow passage 53 and partially consumes impact energy generated by the external force. Thus, the buffer member 31 of the present embodiment improves the buffering function against the external force applied to the outer box 21.

Furthermore, the first opposing welded part 71 and the second opposing welded part 72 are formed in the buffer member 31 at positions adjacent to the connecting flow passage 53 in the second direction, so that each buffer area 50 can be bent at the connecting flow passage 53, and the connecting flow passages 53 of the plurality of buffer areas 50 adjacent to each other in the second direction can be suppressed from being overlapped each other at the end parts in the second direction. This suppresses formation of a corner part at the end part and near the end part (part to be bent) of the connecting flow passage 53.

In addition, the partitioning welded parts 70 formed at positions across the compartment welded part 60 function as the areas for absorbing wrinkles generated in the buffer member 31.

In addition, the dimension L1 between the opposing parts is 70% or less of the dimension L3 when no medium is sealed in the resin sheets 81 and 82, and more preferably $2/\pi$ or less, so that the overlapping of the end parts of the connecting flow passages 53 adjacent to each other in the second direction can be more reliably suppressed in the second direction.

The dimension L1 between the opposing parts is set to be 10% or more of the dimension L3, so that the medium is effectively bent two times while passing through the connecting flow passage 53.

The second support part 52a is defined by the first inclined part 73a and the first support part 51a is defined by the second inclined part 74a, so that the connecting flow passage 53 can be suppressed from being broken and, subsequently, the formation of the corner part in the connecting flow passage 53 can be suppressed.

The above-described effects can be achieved more reliably as the angle $\theta2$ is set to 30 degrees or more and 60 degrees or less.

The partitioning welded parts 70 decrease a bending rigidity of the position near the connecting flow passage 53 to be smaller than a bending rigidity of other parts in the buffer area 50, so that the position where the buffer member 31 is bent can be fixed near the connecting flow passage 53. When the buffer member 31 bends near the connecting flow passage 53, the connecting flow passage 53 bends like twisting around its center axis. This prevents bending in other parts of the buffer area 50, thus suppressing the formation of the corner parts and generation of the wrinkles due to the bending. Therefore, breakage of the buffer member 31 is suppressed when the packed object receives vibrations during transportation.

Although embodiments of the present invention have been described and illustrated in detail, the disclosed embodiments are made for purposes of illustration and example only and not limitation. The scope of the present invention should be interpreted by terms of the appended claims, rather than the description above, and is intended to include any modifications within the scope and meaning equivalent to the terms of the claims.

Figure 9:
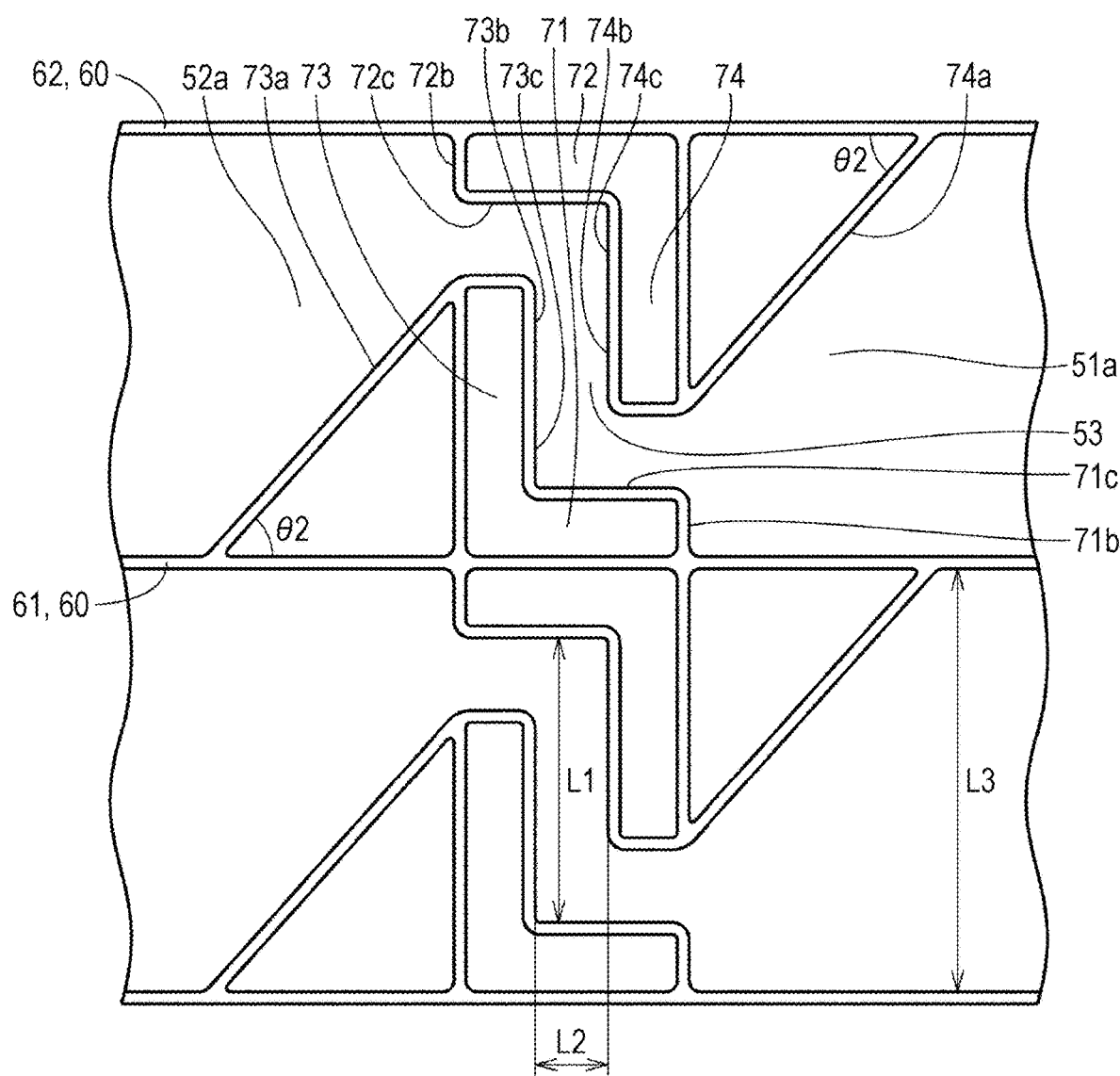
FIG. 9 is a plan view illustrating a modified example of a partitioning welded part.

For example, as illustrated in FIG. 9, the first opposing welded part 71 may have a first stepped part 71b having a shape extending from the compartment welded part 61 toward the adjacent compartment welded part 62 along the second direction, and a first flat part 71c having a shape extending from the tip end of the first stepped part 71b toward the first protruding welded part 73 along the first direction. Similarly, the second opposing welded part 72 may have a second stepped part 72b having a shape extending from the adjacent compartment welded part 62 toward the compartment welded parts 61 along the second direction, and a second flat part 72c having a shape extending toward the second protruding welded part 74 from the second stepped part 72b along the first direction. However, as in the above-described embodiment, the first opposing welded part 71 may have the first guide inclined part 71a and the second opposing welded part 72 may have the second guide inclined part 72a, in order to securely provide a large opening area in which the buffer chambers 51 and 52 are communicating with the connecting flow passage 53, while securely providing a large dimension L1 between the opposing parts.

What is claimed is:

1. A buffer member, comprising:
a resin sheet welded in a bag-like shape; and
a medium sealed in the resin sheet, wherein
the resin sheet includes a plurality of buffer areas each having a shape extending longitudinally in a first direction and arranged adjacent to each other in a second direction orthogonal to the first direction,
each buffer area of the plurality of buffer areas includes
a first buffer chamber having a shape extending in the first direction,
a second buffer chamber having a shape extending in the first direction and formed at a position separated from the first buffer chamber in the first direction, and
a connecting flow passage connecting the first buffer chamber and the second buffer chamber, the connecting flow passage includes two parallel edges that intersect the first direction,
a length of the connecting flow passage in the second direction is smaller than a length of the first buffer chamber and a length of the second buffer chamber in the second direction, and the connecting flow passage of one buffer area of the plurality of buffer areas and the connecting flow passage of an adjacent buffer area adjacent to the one buffer area of the plurality of buffer areas are separated from each other in the second direction, and
the connecting flow passage directs the medium flowing into the connecting flow passage from one of the first buffer chamber and the second buffer chamber along the first direction to bend in a direction intersecting the first direction, while redirecting the medium flowing out of the connecting flow passage and into the other buffer chamber of the first buffer chamber and the second buffer chamber to bend in the first direction again.

2. A buffer member, comprising:
a resin sheet welded in a bag-like shape; and
a medium sealed in the resin sheet, wherein
the resin sheet includes a plurality of buffer areas each having a shape extending longitudinally in a first direction and arranged adjacent to each other in a second direction orthogonal to the first direction,
each buffer area of the plurality of buffer areas includes
a first buffer chamber having a shape extending in the first direction,
a second buffer chamber having a shape extending in the first direction and formed at a position separated from the first buffer chamber in the first direction, and a connecting flow passage connecting the first buffer chamber and the second buffer chamber, a length of the connecting flow passage in the second direction is smaller than a length of the first buffer chamber and a length of the second buffer chamber in the second direction, and the connecting flow passage of one buffer area of the plurality of buffer areas and the connecting flow passage of an adjacent buffer area adjacent to the one buffer area of the plurality of buffer areas are separated from each other in the second direction, and the connecting flow passage directs the medium flowing into the connecting flow passage from one of the first buffer chamber and the second buffer chamber along the first direction to bend in a direction intersecting the first direction, while redirecting the medium flowing out of the connecting flow passage and into the other buffer chamber of the first buffer chamber and the second buffer chamber to bend in the first direction again, wherein the connecting flow passage has a shape directing the medium flowing into the connecting flow passage from the one buffer chamber along the first direction to bend in a direction parallel to the second direction.

3. The buffer member according to claim 1, wherein the first buffer chamber includes a first support part having a shape gradually increasing radially in the second direction as moving away from the connecting flow passage in the first direction, and the second buffer chamber includes a second support part having a shape gradually increasing radially in the second direction as moving away from the connecting flow passage in the first direction.

4. A buffer member forming material that is formed of a resin sheet welded in a bag shape and forms a buffer member by sealing a medium in the resin sheet, comprising:

a plurality of compartment welded parts forming a plurality of buffer areas, each buffer area having a shape extending longitudinally in a first direction and arranged adjacent to each other in a second direction orthogonal to the first direction; and a partitioning welded part that partitions each buffer area of the plurality of buffer areas into a first buffer chamber having a shape extending in the first direction, a second buffer chamber having a shape extending in the first direction and formed at a position separated from the first buffer chamber in the first direction, and a connecting flow passage connecting the first buffer chamber and the second buffer chamber, wherein the partitioning welded part includes a first protruding welded part formed on one side of the connecting flow passage in the first direction, and having a shape protruding from one compartment welded part of the plurality of compartment welded parts toward an adjacent compartment welded part adjacent to the one compartment welded part of the plurality of compartment welded parts, a second protruding welded part formed on the other side of the connecting flow passage in the first direction and having a shape protruding from the adjacent compartment welded part toward the one compartment welded part, a first opposing welded part formed on the one side of the connecting flow passage in the second direction and having a shape protruding from the one compartment welded part toward the adjacent compartment welded part, and a second opposing welded part formed on the other side of the connecting flow passage in the second direction and having a shape protruding from a site opposing the first opposing welded part of the adjacent compartment welded part toward the first opposing welded part, a dimension between the first opposing welded part and the second opposing welded part in the second direction is larger than a dimension of the first opposing welded part and a dimension of the second opposing welded part in the first direction, and the first protruding welded part and the second protruding welded part have an overlapping part overlapping each other across the connecting flow passage in the first direction.

5. The buffer member forming material according to claim 4, wherein the dimension between the first and second opposing welded parts is 70% or less of the dimension between the one compartment welded part and the adjacent compartment welded part in the second direction.

6. The buffer member forming material according to claim 4, wherein the first protruding welded part has a first inclined part having a shape inclined to gradually approach the one compartment welded part as moving away from the connecting flow passage, and the second protruding welded part has a second inclined part having a shape inclined to gradually approach the adjacent compartment welded part as moving away from the connecting flow passage.

7. The buffer member forming material according to claim 6, wherein an angle formed between the first inclined part and the one compartment welded part and an angle formed between the second inclined part and the adjacent compartment welded part are 30 degrees or more and 60 degrees or less.

8. The buffer member forming material according to claim 4, further comprising:

an injection part provided at an end part opposite to a side where the connecting flow passage is located in the first buffer chamber and from which the medium is injected into the buffer area.

9. The buffer member forming material according to claim 8, further comprising:

a check valve provided at the injection part, wherein the check valve allows the medium to flow into the buffer area from the injection part and prohibits the medium to flow out of the buffer area.

* * * * *